Feb. 20, 1962 F. C. POLANSKI 3,021,584
CLAMP HINGE
Filed Aug. 18, 1959
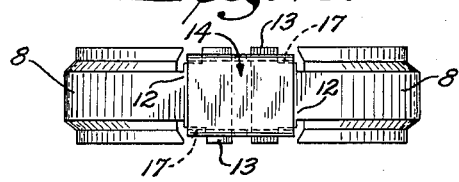
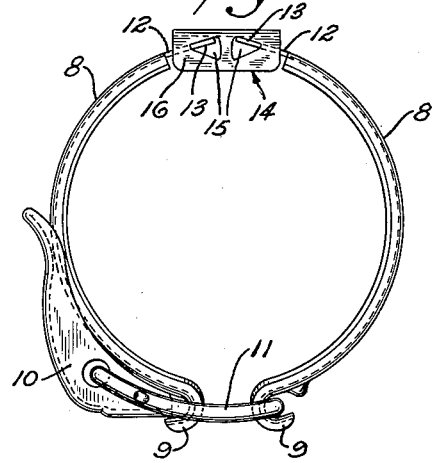
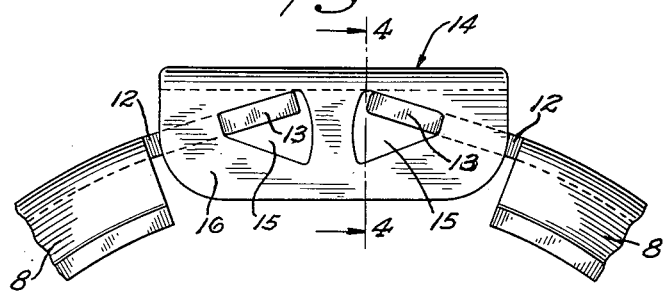
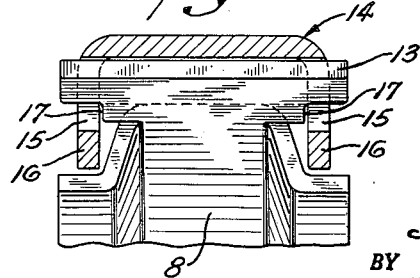
INVENTOR.
Frank C. Polanski,
BY
Morsell & Morsell
ATTORNEYS United States Patent Office
3,021,584
Patented Feb. 20, 1962

3,021,584
CLAMP HINGE
Frank C. Polanski, Kenosha, Wis., assignor to Ladish Co., Cudahy, Wis., a corporation of Wisconsin
Filed Aug. 18, 1959, Ser. No. 834,621
6 Claims. (Cl. 24—270)

This invention relates to improvements in clamp hinges.

Although the invention is not to be restricted thereto, the improved clamp hinge construction finds particular utility in connection with a band clamp used in coupling and uncoupling sections of tubing or pipes found in apparatuses in the dairy industry, which pipe sections are required to be uncoupled for cleansing periodically.

It is, therefore, a primary object of the present invention to provide a clamp hinge of the character described, which facilitates the application of the clamp to pipe or tubing sections, and which is susceptible of being effectively cleansed for sanitary purposes.

A further object of the invention is to provide a clamp hinge construction which permits the elements of the clamp to be strong and resist stretching or distortion.

A further object of the invention is to provide a clamp hinge construction of the character described, wherein the hinge size may be standardized, thereby adapting it for use with various sizes of complementary clamp sections.

A further object of the invention is to provide a clamp hinge construction which is simple to manufacture, which is devoid of rivets and which can be easily assembled in a small press.

A further specific object of the invention is to provide, in a clamp hinge construction, a flanged hinge plate joining the inner ends of the complementary clamp or strap sections, the latter having T-shaped end portions which are engaged within sector-shaped openings in the flanges of the hinge plate to permit opening and closing movement of the clamp sections.

A further object of the invention is to provide a clamp hinge which is of very simple construction, which may be maintained in a sanitary condition, which is easy to apply and release with respect to abutting tube or pipe ends, which is strong and durable, and which is well adapted for the purposes described.

With the above and other objects in view, the invention consists of the improved clamp hinge, and its parts and combinations as set forth in the claims, and all equivalents thereof.

In the accompanying drawing in which the same reference characters indicate the same parts in all the views:

FIG. 1 is a plan view of the clamp in its closed condition;

FIG. 2 is a side view of the closed clamp looking at the hinged end thereof;

FIG. 3 is an enlarged fragmentary view looking at a flange of the hinge plate and the connected portions of the complementary clamp elements or straps;

FIG. 4 is a fragmentary detail sectional view taken on line 4—4 of FIG. 3.

From FIGS. 1 and 2 of the drawing it will appear that the clamp per se comprises a pair of complementary curved clamp sections or straps 8 formed of metal, each section being channel-shaped in cross section to embrace flanges of adjacent pipe or tubing ends (not shown) when in use, so as to clamp the pipe or tubing ends together. The outer ends of the clamp sections or straps are provided with hook-shaped ends 9, one of which engages the extremity of a pivotal locking lever 10, and the other of which is adapted to be clampingly engaged by the end portion of a toggle link 11 pivotally associated with the locking lever 10.

At the opposite or inner ends of the clamp sections or straps 8, the channeled portions thereof are omitted to provide curved tongues 12. Each tongue carries at its extremity a transverse head 13 so that the tongues 12 with their heads 13 form in effect T-heads whose lateral edges are stepped.

The numeral 14 designates a hinge bracket which is U-shaped in cross-section and which serves as a connector for the T-headed ends 12—13 of the complementary clamp straps. As applied, the bracket 14 straddles the adjacent T-headed portions 12—13 of the hinge straps, and the opposite side walls or flanges 16 thereof each have a pair of oppositely directed sector-shaped openings 15 therein. Each transversely aligned pair of openings 15 is adapted to swingably receive and engage the T-headed end 13 of the tongue 12 of a hinge strap 8, with the shoulders 17 thereof being adjacent the inner faces of the flanges 16 to prevent lateral withdrawal of the T-headed portions from the hinge bracket flange openings 15.

It will be obvious that the assembly of the improved clamp and hinge structure is extremely simple. The metal hinge bracket 14 is originally formed with its side flanges 16 somewhat spread. The complementary sections or straps 8 of the clamp are arranged with their T-headed ends in juxta-position, and then a hinge bracket 14 with the side flanges thereof spread, is positioned so as to straddle the adjacent T-headed ends of the clamp straps, whereupon, through a simple press operation, the side flanges 16 of the hinge bracket 14 are bent inwardly at right angles to the adjacent wall of the hinge bracket, and this causes the T-headed ends of the clamp sections to be projected through the sector-shaped openings 15 in the side flanges of the hinge bracket, resulting in the arrangement illustrated. The hinge bracket 14 as thus engaged with the T-headed ends of the complementary sections of the clamp, hingedly joins said ends together to permit relative opening and closing movements of the clamp sections 8. This assembly and mounting of the hinge bracket is accomplished without the use of rivets, pintles, or other connectors.

When the clamp is in the closed condition illustrated in FIG. 1, the laterally extended ends of the T-head extremities of the clamp straps 8, projecting through the flange openings 15, will be in the position shown in FIGS. 1 and 3. However, when the toggle link 11 and clamping lever 10 of the clamp are released for the purpose of opening or spreading the clamp, the T-headed ends of the clamp straps are free to shift in the hinge bracket openings 15 to positions opposite from that illustrated.

The simplicity of the clamp hinge renders it extremely easy to cleanse, and the pivotal movement of the T-headed ends of the clamp straps within the bracket openings permits spreading and closing movements of the clamp without straining any portions thereof, whereby the clamp resists stretching and distortion. The improved clamp hinge construction, besides being simple and easy to assemble, is inexpensive, effective in use, and well adapted for the purposes described.

What is claimed as the invention is:

1. In a band clamp, a pair of curved complementary band sections channel-shaped in cross section and having relatively movable generally flat juxtaposed extensions from the channel webs, each extension having an integral ear projecting in substantially the same plane from each side thereof at its end, and a channeled hinge bracket having a web portion and having side walls straddling the adjacent ends of said extensions, there being a pair of relatively large openings in each side wall of said bracket, each opening being shaped to receive an ear for swinging movement of a portion of the ear therein toward and away from said web portion of the hinge bracket during hinging movement of the band sections relative to each other whereby said hinging movement may take place without flexing of the band or extensions and said openings having edges positioned to be engaged by said ears to form stops.

2. In a band clamp, a pair of curved complementary band sections having relatively movable juxtaposed inner end extensions, each extension having an ear projecting from each side thereof at its end and each ear having an outer edge, and a channeled hinge bracket having side walls straddling the adjacent ends of said extensions, there being a pair of relatively large generally triangular openings in each side wall of said bracket, with the bases of the triangular openings on the same side juxtaposed and extending generally transversely of the bracket, each opening receiving an ear whereby during hinging movement of the band sections relative to each other the outer edge of each ear will move through an arcuate path in its opening.

3. In a band clamp a pair of curved complementary band sections having relatively movable juxtaposed inner end extensions, each extension having an ear projecting from each side thereof at its end and each ear having an inner edge and an outer edge, and a channeled hinge bracket having side walls straddling the adjacent ends of said extensions, there being a pair of relatively large generally triangular openings in each side wall of said bracket, with the bases of the triangular openings on the same side juxtaposed and extending generally transversely of the bracket, each opening receiving an ear with the inner edge of each ear disposed at the apex of its triangular opening whereby during hinging movement of the band sections relative to each other the outer edge of each ear will move through an arcuate path along the base of its triangular opening.

4. In a band clamp, a pair of curved complementary band sections having relatively movable juxtaposed inner end extensions, each of said inner end extensions being formed as a tongue with lateral projections forming shoulders, and a hinge bracket straddling the adjacent tongue ends of the band sections and having side wall flanges each formed with a pair of relatively large generally triangularly-shaped openings therein receiving the lateral projections of the tongues with the shoulders formed by the projections engaging the side wall flanges of the bracket, said openings being so disposed that the outer edges of the projections on the tongues are arcuately movable within the flange openings along the bases of said triangular openings to permit relative opening and closing movements of the band sections.

5. In a band clamp, a pair of curved complementary band sections having relatively movable juxtaposed inner end extensions, each of said inner end extensions being formed as a tongue with a T-head having integral lateral projections, and a channeled hinge bracket straddling the adjacent tongue ends of the band sections and having a web portion and having side walls, the side walls of said bracket being formed with pairs of opposed relatively large openings therein, with each opposed pair of said openings being shaped to movably receive the end portions of said integral lateral projections of the T-head of a tongue for swinging movement of portions of said lateral projections toward and away from said web portion of the hinge bracket to provide for opening and closing hinging movements of the band sections, and said openings having edges positioned to be engaged by said end portions of the T-head to form stops.

6. In a band clamp, a pair of curved, complementary similar band sections of channel cross section having a pair of relatively movable juxtaposed inner end extensions, each of said inner end extensions being formed as a flat tongue integral with a web of the channel cross section of one of said band sections and having flat lateral projections in the same general plane, a flanged hinge bracket straddling the adjacent tongue ends of the band sections and having a portion between the inner ends of the complementary band sections, the hinge bracket having a web and having side wall flanges formed with pairs of openings therein shaped to receive said flat lateral projections of the tongues with the shoulders formed on the tongues engaging the flanges of the bracket, the openings being so shaped that portions of the shouldered ends of the tongues are hingedly swingable toward and away from said web of the hinge bracket within the flange openings without lateral displacement, to permit opening and closing movements of the band sections, and toggle clamp members operatively carried by the other end portions of the band sections.

References Cited in the file of this patent

UNITED STATES PATENTS

| | | |
|---|---|---|
| 1,904,340 | Wright | Apr. 18, 1933 |
| 2,882,071 | Klompar | Apr. 14, 1959 |

FOREIGN PATENTS

| | | |
|---|---|---|
| 104,454 | Germany | July 24, 1899 |
| 738,017 | France | Oct. 10, 1932 |